US008339461B2

(12) United States Patent
Xavier

(10) Patent No.: US 8,339,461 B2
(45) Date of Patent: Dec. 25, 2012

(54) SIGNAL CONVERTING APPARATUS CAPABLE OF LINEARLY OR NON-LINEARLY UPDATING REFERENCE PARAMETERS

(75) Inventor: Michel Xavier, Chiba (JP)

(73) Assignee: Sony Corporation, Tokyo (JP)

( * ) Notice: Subject to any disclaimer, the term of this patent is extended or adjusted under 35 U.S.C. 154(b) by 1346 days.

(21) Appl. No.: 12/033,835

(22) Filed: Feb. 19, 2008

(65) Prior Publication Data

US 2008/0218220 A1 Sep. 11, 2008

(30) Foreign Application Priority Data

Mar. 9, 2007 (JP) ................................ P2007-059627

(51) Int. Cl.
*H04N 17/02* (2006.01)
*H04N 9/64* (2006.01)
*H04N 5/14* (2006.01)

(52) U.S. Cl. ........ 348/184; 348/571; 348/673; 348/671; 348/569

(58) Field of Classification Search .................. 348/571, 348/569, 606, 607, 625, 180, 184, 222.1, 348/229.1, 241, 252, 254, 255, 575, 645, 348/655, 671, 678, 687, 673, 674, 708, 707; 345/589, 600, 611, 690; 358/518–521, 530, 358/443, 447, 448, 461, 3.01; 382/162, 167–169, 382/274, 275

See application file for complete search history.

(56) References Cited

U.S. PATENT DOCUMENTS

| | | | | |
|---|---|---|---|---|
| 5,191,420 A | * | 3/1993 | Lagoni et al. | 348/687 |
| 5,317,240 A | * | 5/1994 | Keller | 315/383 |
| 5,422,680 A | * | 6/1995 | Lagoni et al. | 348/674 |
| 5,712,930 A | * | 1/1998 | Watanabe | 382/270 |
| 5,808,699 A | * | 9/1998 | Tsujihara et al. | 348/673 |
| 7,894,524 B2 | * | 2/2011 | Demos | 375/240.15 |
| 2003/0142377 A1 | * | 7/2003 | Yamada et al. | 358/521 |
| 2006/0152630 A1 | * | 7/2006 | Miyazawa | 348/606 |
| 2006/0215908 A1 | * | 9/2006 | Kamon et al. | 382/167 |
| 2006/0215925 A1 | * | 9/2006 | Kuniba | 382/254 |
| 2009/0184984 A1 | * | 7/2009 | Takahara | 345/690 |

FOREIGN PATENT DOCUMENTS

| | | |
|---|---|---|
| JP | 2002-57959 | 2/2002 |
| JP | 2002-112025 | 4/2002 |
| JP | 2005-328395 | 11/2005 |
| JP | 2006-013618 | 1/2006 |
| JP | 2006-345309 | 12/2006 |

* cited by examiner

*Primary Examiner* — Victor Kostak

(74) *Attorney, Agent, or Firm* — Finnegan, Henderson, Farabow, Garrett & Dunner LLP

(57) ABSTRACT

A signal converting apparatus includes the following elements. A converting section converts an input signal into output signals on the basis of the values of reference parameters, serving as references of a plurality of parameters for signal conversion, and the values of newly proposed parameters. An evaluation input receiving section receives an evaluation input indicating the selection of either the output signal based on the values of the reference parameters or the output signal based on the values of the newly proposed parameters. A parameter updating section linearly changes the values of the newly proposed parameters when the evaluation input indicates the selection of the output signal based on the values of the newly proposed parameters, and nonlinearly changes the values of the reference and newly proposed parameters when the evaluation input indicates the selection of the output signal based on the values of the reference parameters.

8 Claims, 10 Drawing Sheets

FIG. 3
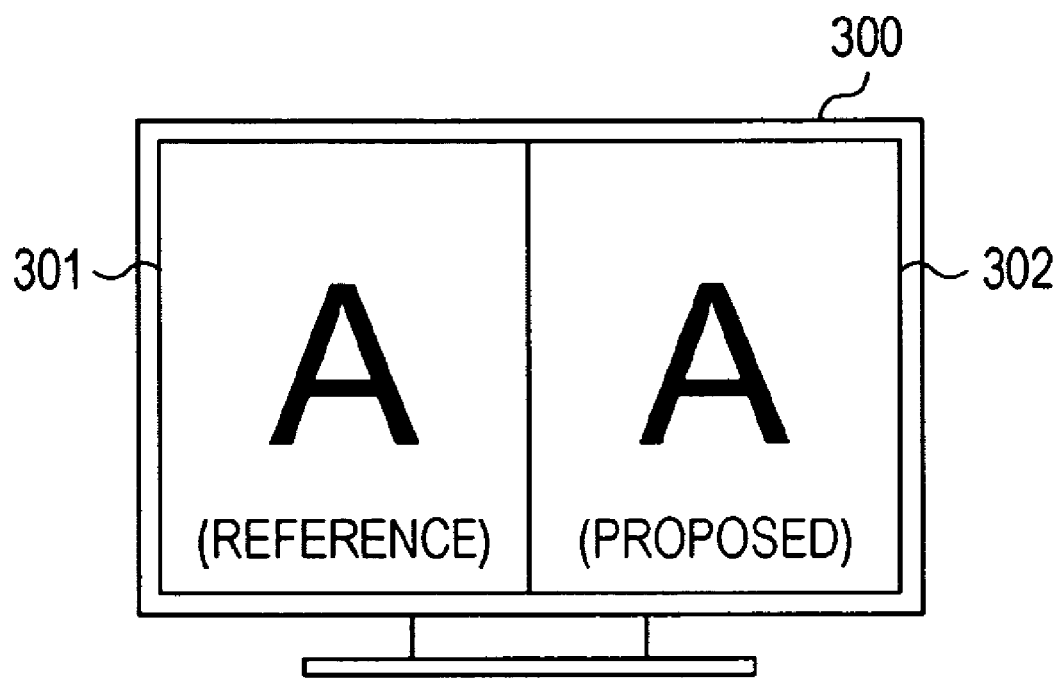
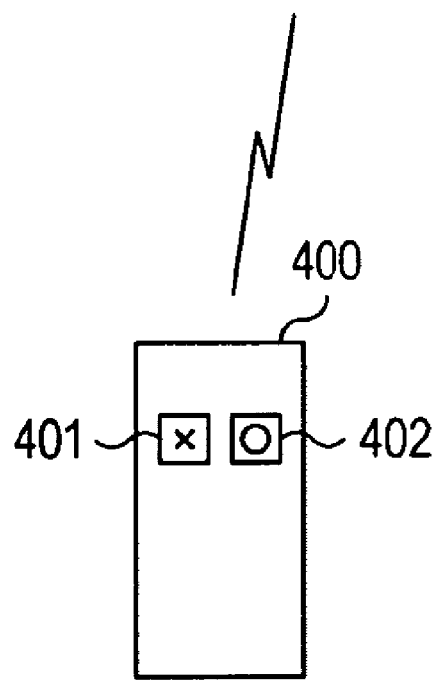

SIGNAL CONVERTING APPARATUS CAPABLE OF LINEARLY OR NON-LINEARLY UPDATING REFERENCE PARAMETERS

CROSS REFERENCES TO RELATED APPLICATIONS

The present invention contains subject matter related to Japanese Patent Application JP 2007-059627 filed in the Japanese Patent Office on Mar. 9, 2007, the entire contents of which are incorporated herein by reference.

BACKGROUND OF THE INVENTION

1. Field of the Invention

The present invention relates to signal converting apparatuses and, in particular, to a signal converting apparatus for performing conversion processing according to a user preference, a method for conversion processing, and a program that allows a computer to implement the method.

2. Description of the Related Art

A related-art video apparatus, such as a television receiver or a digital versatile disk (DVD) player, displays items that are adjustable in the apparatus on a menu screen and a user adjusts each item that the user wants to adjust. For example, Japanese Unexamined Patent Application Publication No. 2002-057959 discloses an image display system for displaying a menu of adjustment items.

SUMMARY OF THE INVENTION

The video apparatus has a variety of adjustment items that affect one another. For example, regarding adjustment of noise reduction, the higher a set noise reduction value, the higher the effect of noise reduction. Unfortunately, this adjustment produces a side effect in that the reproducibility of details of an image is reduced and the image is blurred. Regarding adjustment of sharpness, the higher a set sharpness value, the higher the reproducibility of details. Disadvantageously, this adjustment produces a side effect in that noise is emphasized. As described above, noise reduction and sharpness have characteristics conflicting with each other. When those adjustment items are adjusted by the same amount, the effect and side effect of one adjustment item cancel out those of the other adjustment item. Therefore, when the various adjustment items are individually adjusted, cancelling occurs in succession. It is difficult to obtain an image with a stable state comprehensively matched to a user preference. The influences of the adjustment items on one another become increasingly prominent as the number of adjustment items increases.

A conceivable approach to solving the complicated problems caused by the above-described influences of the adjustment items on one another is to provide preset modes and allow the user to select any of the preset modes. In this case, however, the user has extremely limited choices. It is difficult to suit the state of an output to the user preference.

The present invention is made in consideration of the above-described problems and it is desirable to adjust an image and/or sound of a video apparatus according to a user preference.

The present invention is made to solve the above-described problems. According to an embodiment of the present invention, a signal converting apparatus includes the following elements. A converting section converts an input signal into output signals on the basis of the values of reference parameters, serving as references of a plurality of parameters for signal conversion, and the values of newly proposed parameters. An evaluation input receiving section receives an evaluation input indicating the selection of either the output signal based on the values of the reference parameters or the output signal based on the values of the newly proposed parameters. A parameter updating section linearly changes the values of the newly proposed parameters when the evaluation input indicates the selection of the output signal based on the values of the newly proposed parameters, and nonlinearly changes the values of the reference parameters and the values of the newly proposed parameters when the evaluation input indicates the selection of the output signal based on the values of the reference parameters. Advantageously, the values of parameters are linearly or nonlinearly changed in accordance with an evaluation input, thus converting a signal according to the evaluation input.

In this embodiment, the signal converting apparatus may further include a time measuring section that measures the time taken before the evaluation input is received. When the evaluation input indicates the selection of the output signal based on the values of the newly proposed parameters, the parameter updating section may linearly change the values of the reference parameters in accordance with the time measured by the time measuring section. Consequently, the values of the reference parameters are changed in accordance with the time required for evaluation input. In this case, preferably, the parameter updating section changes the values of the reference parameters such that the values of the reference parameters are larger as the time measured by the time measuring section is shorter. The reason is as follows: If the user takes long time to input an evaluation, the user might hesitate to make a judgment.

In this embodiment, the parameter updating section may nonlinearly change the values of the newly proposed parameters and then linearly change the values of the reference and newly proposed parameters corresponding to any one of the plurality of parameters. Advantageously, updating the reference and newly proposed parameters corresponding to at least one parameter that may affect a negative evaluation is suspended and the other parameters are determined.

According to the embodiment, the plurality of parameters for signal conversion may include at least one of contrast, sharpness, and brightness of an image signal.

According to another embodiment of the present invention, there is provided a method of signal conversion for a signal converting apparatus that converts an input signal into output signals on the basis of the values of reference parameters, serving as references of a plurality of parameters for signal conversion, and the values of newly proposed parameters. The method includes the steps of receiving an evaluation input indicating the selection of either the output signal based on the values of the reference parameters or the output signal based on the values of the newly proposed parameters, and linearly changing the values of the newly proposed parameters when the evaluation input indicates the selection of the output signal based on the values of the newly proposed parameters, and nonlinearly changing the values of the reference parameters and the values of the newly proposed parameters when the evaluation input indicates the selection of the output signal based on the values of the reference parameters.

According to another embodiment of the present invention, a program allows a computer to execute the above-described steps.

Advantageously, the values of parameters are linearly or nonlinearly changed in accordance with an evaluation input, thus converting a signal according to the evaluation input.

According to the embodiments of the present invention, advantageously, the values of parameters are repeatedly changed linearly or nonlinearly in a video apparatus on the basis of a user's evaluation, so that an output can be stabilized in a state that suits a user's preference.

BRIEF DESCRIPTION OF THE DRAWINGS

FIG. 3 is a diagram showing an evaluation input state in accordance with the embodiment of the present invention;

DESCRIPTION OF THE PREFERRED EMBODIMENTS

An embodiment of the present invention will be described in detail with reference to the drawings.

Figure 1:
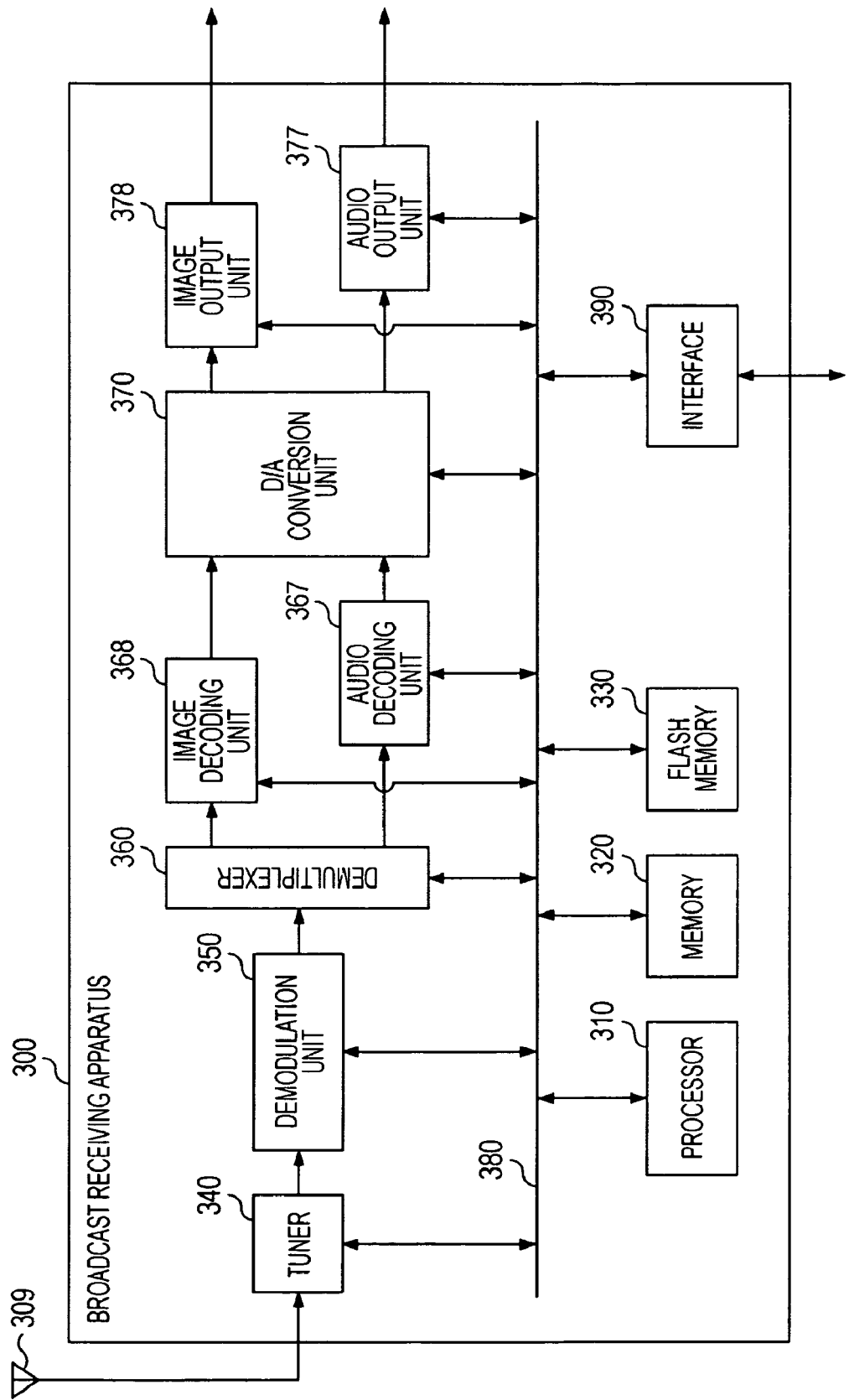
FIG. 1 is a block diagram of a broadcast receiving apparatus 300, serving as an example of a video apparatus according to an embodiment of the present invention.

FIG. 1 illustrates the structure of a broadcast receiving apparatus 300, serving as a concrete example of a video apparatus according to an embodiment of the present invention. The broadcast receiving apparatus 300 includes a processor 310, a memory 320, a flash memory 330, a tuner 340, a demodulation unit 350, a demultiplexer 360, an audio decoding unit 367, an image decoding unit 368, a digital-analog (D/A) conversion unit 370, an audio output unit 377, an image output unit 378, and an interface 390, the components connecting to a bus 380. The tuner 340 is connected to an antenna 309, serving as an external device.

The processor 310 controls operations of the entire broadcast receiving apparatus 300. The memory 320 corresponds to a main memory of the processor 310 and stores a program running on the processor 310. The flash memory 330 is a nonvolatile recording medium and is used to hold information necessary after the broadcast receiving apparatus 300 is turned off. Therefore, when the broadcast receiving apparatus 300 is turned on, data indicating the contents of the flash memory 330 is transferred to the memory 320.

The tuner 340 detects signals transmitted on a predetermined channel from broadcast signals supplied from the antenna 309 under the control of the processor 310 and supplies the detected broadcast signals to the demodulation unit 350. The broadcast signals may include terrestrial broadcast signals and satellite signals of broadcast satellite (BS) broadcasting and communications satellite (CS) broadcasting. The demodulation unit 350 demodulates the broadcast signals supplied from the tuner 340 to extract data and supplies the data to the demultiplexer 360 under the control of the processor 310. In digital broadcasting, the data is digitally modulated according to, for example, phase shift keying (PSK). The demodulation unit 350 extracts data from the digitally modulated signals.

The demultiplexer 360 separates the data supplied from the demodulation unit 350 into audio data and image data and supplies the audio data and the image data to the audio decoding unit 367 and the image decoding unit 368, respectively. In digital broadcasting, the demultiplexer 360 functions as, for example, a transport decoder for digital data and demultiplexes a transport stream of MPEG-2 (Moving Picture Experts Group 2) into an audio stream, serving as audio data, and a video stream, serving as video data. In this case, the demultiplexer 360 separates program specific information (PSI) and service information (SI) from the transport stream.

The audio decoding unit 367 decodes the audio data supplied from the demultiplexer 360 and supplies the resultant data to the D/A conversion unit 370. The image decoding unit 368 decodes the image data supplied from the demultiplexer 360 and supplies the resultant data to the D/A conversion unit 370. For example, the audio decoding unit 367 and the image decoding unit 368 MPEG-decode the MPEG-encoded audio and video streams to produce audio and image signals, respectively.

The D/A conversion unit 370 converts the digital signals supplied from the audio decoding unit 367 and the image decoding unit 368 into analog audio and image signals. The D/A conversion unit 370 supplies the analog audio and image signals to the audio output unit 377 and the image output unit 378, respectively. The image signals output from the image output unit 378 are supplied to a display (not shown). The audio signals output from the audio output unit 377 are supplied to a speaker (not shown).

The interface 390 transfers an external operation input to the bus 380 in the broadcast receiving apparatus 300. The interface 390 may include, for example, a receiver for receiving a signal from a remote controller.

Figure 2:
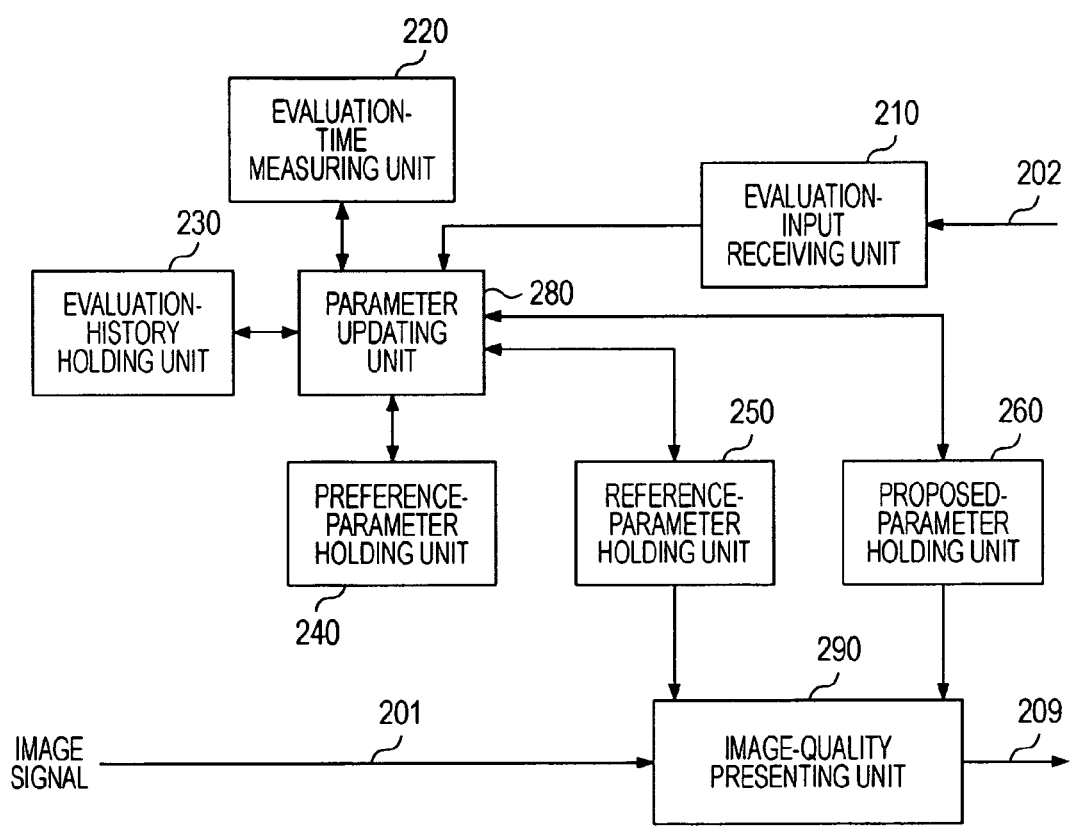
FIG. 2 is a block diagram of an image conversion function in accordance with the embodiment of the present invention.

FIG. 2 is a block diagram of an image conversion function in accordance with the present embodiment of the present invention. In the present embodiment, it is assumed that examples of parameters for signal conversion processing include parameters for image display. In this case, an evaluation-history holding unit 230, a preference-parameter holding unit 240, a reference-parameter holding unit 250, and a proposed-parameter holding unit 260 are provided as components for holding data necessary for the image conversion processing. In addition, an evaluation-input receiving unit 210, an evaluation-time measuring unit 220, a parameter updating unit 280, and an image-quality presenting unit 290 are provided as components for realizing the image conversion processing.

The evaluation-input receiving unit 210 receives a user's evaluation input about the qualities of images currently displayed. The currently displayed images include an image based on reference parameters and an image based on proposed parameters. The reference and proposed parameters will be described later. The user inputs their image-quality preference on the images based on the respective combinations of the parameters, namely, which image (the quality thereof) the user prefers. The evaluation input is received by the evaluation-input receiving unit 210 via a signal line 202.

The evaluation-time measuring unit 220 is a timer that measures the time required after the images are displayed until the user inputs an evaluation. Data indicating the time measured by the evaluation-time measuring unit 220 is supplied to the parameter updating unit 280 each time an evaluation is input.

The evaluation-history holding unit 230 holds evaluation inputs received by the evaluation-input receiving unit 210 and a history of the values of parameters corresponding to the respective evaluation inputs.

The preference-parameter holding unit 240 holds the values of parameters that are determined to best suit the user preference at that time while the user repeatedly inputs an evaluation.

The reference-parameter holding unit 250 holds, as reference parameters, parameters of an image that serves as a reference for an evaluation input by the user. The proposed-parameter holding unit 260 holds, as proposed parameters, parameters of an image that is newly proposed on the basis of the image based on the reference parameters. In other words, the user selects either an image signal based on the values of reference parameters or an image signal based on the values of proposed parameters as an image signal that better suits the user preference. The selection serves as an evaluation input.

The parameter updating unit 280 updates the reference parameters held by the reference-parameter holding unit 250 and the proposed parameters held by the proposed-parameter holding unit 260 in accordance with an evaluation input received through the evaluation-input receiving unit 210. An updating process will be described in detail later.

The image-quality presenting unit 290 converts an image signal supplied via a signal line 201 on the basis of the reference and proposed parameters updated by the parameter updating unit 280, and outputs the resultant signals to a signal line 209. Thus, an image having a quality based on the reference parameters and an image having a quality based on the proposed parameters are presented to the user.

FIG. 3 is a diagram showing an evaluation input state in the present embodiment of the present invention. Referring to FIG. 3, an image 301 based on reference parameters is displayed on the left of a screen of the broadcast receiving apparatus 300 and an image 302 based on proposed parameters is displayed on the right thereof. The user determines whether the image 302 based on the proposed parameters better suits their preference than the image 301 based on the reference parameters and inputs an evaluation indicating the determination using a remote controller 400.

As for the remote controller 400, any device capable of inputting a preference evaluation may be used. For example, the remote controller 400 includes a negative input button 401 used to select the image 301 based on the reference parameters and a positive input button 402 used to select the image 302 based on the proposed parameters. Accordingly, the user can easily input an evaluation using the remote controller 400.

Figure 4:
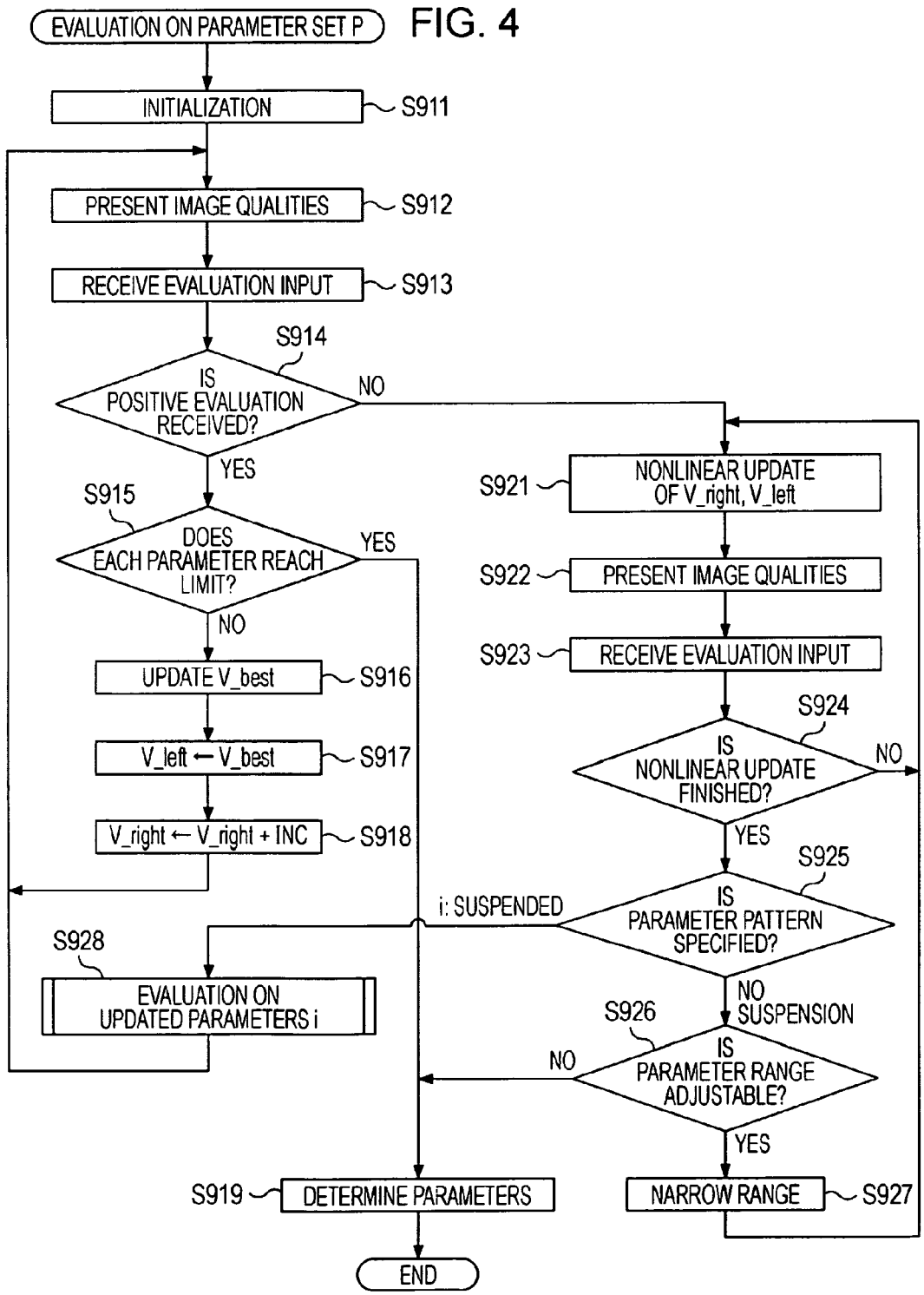
FIG. 4 is a flowchart of a process performed by a parameter updating unit 280 in accordance with the embodiment of the present invention.

FIG. 4 is a flowchart of a process performed by the parameter updating unit 280 in accordance with the present embodiment of the present invention. According to this process, a set P of parameters is used and the values of the parameters are appropriately changed to find settings that suit the user preference.

As for the parameter set P, initial values of reference parameters are set to the reference-parameter holding unit 250 and initial values of proposed parameters are set to the proposed-parameter holding unit 260 (step S911). Assuming that the parameter set P includes three parameters A, B, and C, reference parameters V_left(A), V_left(B), and V_left(C) and proposed parameters V_right(A), V_right(B), and V_right(C) are set.

On the basis of the above-described parameters, the image-quality presenting unit 290 presents the image qualities of the images, as shown in FIG. 3 (step S912). The evaluation-input receiving unit 210 receives an evaluation input regarding the image qualities presented as described above (step S913).

When the evaluation input received in step S913 indicates a positive evaluation (step S914), namely, it is determined in step S914 that the image quality based on the proposed parameters better suits the user preference than the image quality based on the reference parameters, linear update of parameters is performed as will be described later. When the value of each parameter reaches the limit of a parameter set range (step S915), the parameters are determined at that time (step S919).

The preference-parameter holding unit 240 holds the values of preference parameters determined as parameters that best suit the user preference at that time. It is assumed that preference parameters corresponding to the three parameters A, B, and C are called parameters V_best(A), V_best(B), and V_best(C). In addition, it is assumed that parameters of a positively evaluated object are called parameters V_yes(A), V_yes(B), and V_yes(C). In this case, V_yes(A)=V_right(A), V_yes(B)=V_right(B), and V_yes(C)=V_right(C). When the positive evaluation input is received, the values of the preference parameters are updated using the following Expression 1 (step S916):

$$V\_best(A)=(V\_best(A)+\text{time evaluation function}(T)\times V\_yes(A))/(1+\text{time evaluation function}(T))$$

$$V\_best(B)=(V\_best(B)+\text{time evaluation function}(T)\times V\_yes(B))/(1+\text{time evaluation function}(T))$$

$$V\_best(C)=(V\_best(C)+\text{time evaluation function}(T)\times V\_yes(C))/(1+\text{time evaluation function}(T))$$

where, the time evaluation function (T) is a function that obtains a value inversely proportional to time T taken for the user to input an evaluation. The longer the time T taken for evaluation, the lower the value obtained by the time evaluation function (T). Thus, an influence of the positively evaluated parameters V_yes(A), V_yes(B), and V_yes(C) becomes smaller. Whereas, the shorter the time T taken for evaluation, the higher the value obtained by the time evaluation function (T). Consequently, the influence of the positively evaluated parameters V_yes(A), V_yes(B), and V_yes(C) becomes larger. The reason is as follows: If the user takes long time to input an evaluation, the user might hesitate to make a judgment. Accordingly, an influence of an evaluation input at that time has to be minimized.

Figure 5:
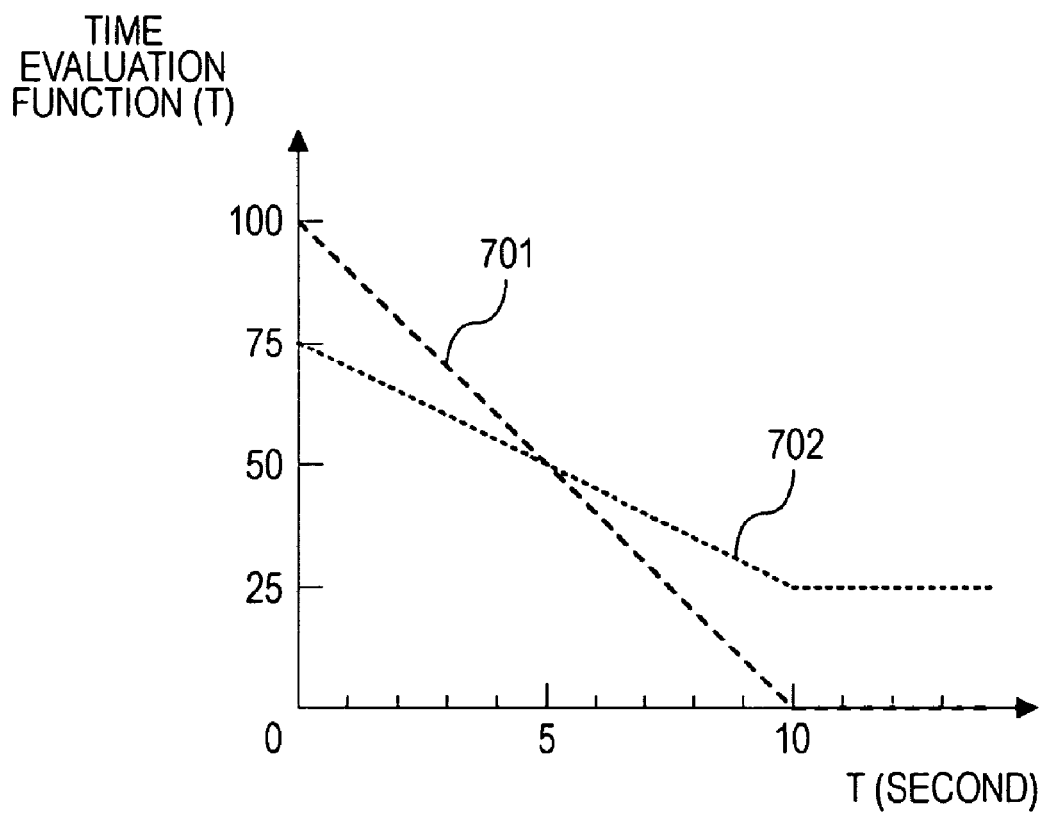
FIG. 5 is a diagram showing examples of a time evaluation function in accordance with the embodiment of the present invention.

FIG. 5 shows examples of the time evaluation function (T). In a first example 701, as the time required until the user inputs an evaluation approaches zero seconds, a value obtained by the time evaluation function (T) approaches "100". When ten seconds elapses before the user inputs an evaluation, a value obtained by the time evaluation function (T) indicates "0". In this example 701, update depending strongly on evaluation time is performed. In a second example 702, as the time required until the user inputs an evaluation approaches zero seconds, a value obtained by the time evaluation function (T) approaches "75". When ten seconds elapses before the user inputs an evaluation, a value obtained by the time evaluation function (T) indicates "25". In this example 702, update depending weakly on evaluation time is performed.

The updated values of the preference parameters are used as the reference parameters. The reference parameters are updated using the following Expression 2 (step S917).

$$V\_left(A)=V\_best(A)$$

$$V\_left(B)=V\_best(B)$$

$$V\_left(C)=V\_best(C)$$

In addition, the proposed parameters are linearly changed (simply increased or simply decreased) using the following Expression 3 (step S918):

$$V\_right(A)=V\_right(A)+INC(A)$$

$$V\_right(B)=V\_right(B)+INC(B)$$

$$V\_right(C)=V\_right(C)+INC(C)$$

where INC(A), INC(B), and INC(C) indicate the amounts of change of the respective parameters.

The above-described linear update is repeated so long as a positive evaluation is successively received (step S914).

When the evaluation input received in step S913 indicates not a positive evaluation but a negative evaluation (step S914), namely, it is determined in step S914 that the image quality based on the reference parameters better suits the user preference than that based on the proposed parameters, nonlinear update of the parameters is performed as follows.

According to nonlinear update, the reference parameters and the proposed parameters are nonlinearly updated as will be described later (step S921). The image-quality presenting unit 290 presents the image qualities, as shown in FIG. 3, on the basis of the updated parameters (step 3922). The evaluation-input receiving unit 210 receives an evaluation input on the image qualities presented as described above (step S923).

In the nonlinear update, the values of the negatively evaluated parameters in linear update are compared to those of the preference parameters and it is determined which or which combination of the negatively evaluated parameters affects the negative evaluation. Specifically, assuming that there are three parameters A, B, and C, it is determined which or which combination of the parameters, i.e., (1) only the parameter A, (2) only the parameter B, (3) only the parameter C, (4) the parameters A and B, (5) the parameters A and C, (6) the parameters B and C, and (7) the parameters A, B, and C affect the negative evaluation. In other words, it is determined which of the above-described seven patterns affects the negative evaluation.

Assuming that negatively evaluated parameters A, B, and C are termed parameters V_no(A), V_no(B), and V_no(C), the reference parameters are updated using the following Expression 4.

$V\_left(A) = Left\_Weight(A) \times V\_best(A) + (1 - Left\_Weight(A)) \times V\_no(A)$ $V\_left(B) = Left\_Weight(B) \times V\_best(B) + (1 - Left\_Weight(B)) \times V\_no(B)$ $V\_left(C) = Left\_Weight(C) \times V\_best(C) + (1 - Left\_Weight(C)) \times V\_no(C)$ The proposed parameters are updated using the following Expression 5.

$V\_right(A) = Right\_Weight(A) \times V\_best(A) + (1 - Right\_Weight(A)) \times V\_no(A)$ $V\_right(B) = Right\_Weight(B) \times V\_best(B) + (1 - Right\_Weight(B)) \times V\_no(B)$ $V\_right(C) = Right\_Weight(C) \times V\_best(C) + (1 - Right\_Weight(C)) \times V\_no(C)$ In the above expressions, Left_Weight(A) to Left_Weight (C) and Right_Weight(A) to Right_Weight (C) are weights set in accordance with the stage of nonlinear update.

When it is obvious, on the basis of the result of the evaluation input in nonlinear update, that the pattern (including at least one parameter) which may affect the negative evaluation is specified, alternatively, that the pattern which may affect the negative evaluation is not specified, nonlinear update is finished (step S924). If the above cases do not apply, step S921 and the subsequent steps are repeated.

If it is obvious, on the basis of the evaluation input in nonlinear update, that the pattern which may affect the negative evaluation is specified (step S925), updating the parameters i related to the pattern is suspended. The other parameters (P-i) in the parameter set P are updated and evaluation is continued (step S928).

Whereas, if it is obvious, on the basis of the result of the evaluation input in nonlinear update, that the pattern which may affect the negative evaluation is not specified (step S925), it is determined whether the range of each parameter can be narrowed (step S926). If each parameter range can be narrowed, the range is narrowed (step S927). After that, step S921 and the subsequent steps are repeated. If it is difficult to narrow each parameter range, the parameters are determined at that time (step S919).

Figure 6:
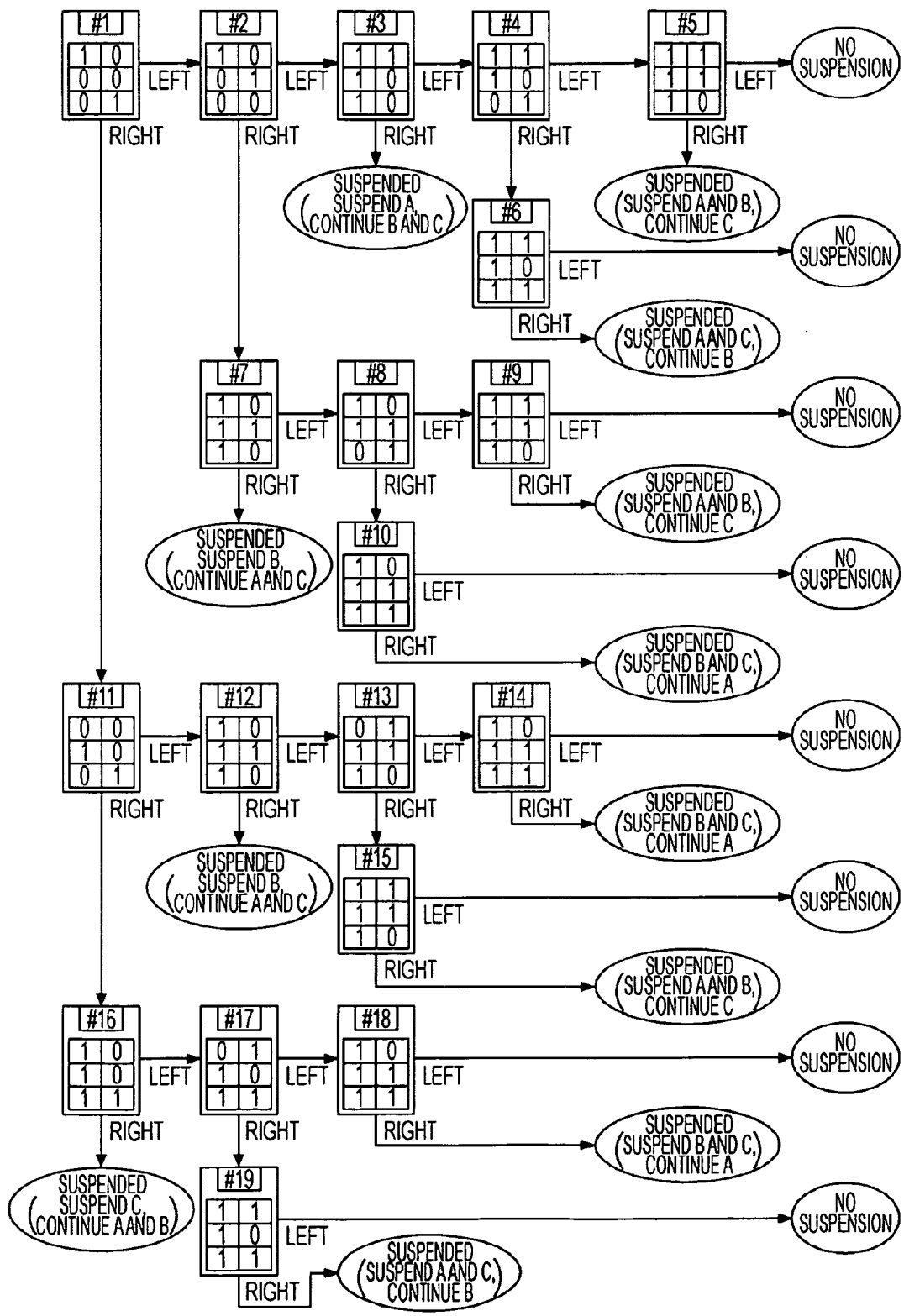
FIG. 6 is a state transition diagram in nonlinear update in accordance with the embodiment of the present invention.

FIG. 6 is a state transition diagram illustrating an example of nonlinear update in accordance with the present embodiment of the present invention. Referring to FIG. 6, 19 boxes each indicate a state. Numbers #1 to #19 are assigned to the respective boxes. The state #1 is set before nonlinear update is started.

Referring to FIG. 6, a set of reference and proposed parameters are shown in each state. The state changes to another state in accordance with an evaluation input by the user. When the pattern (including at least one parameter) that may affect a negative evaluation in linear update is specified, at least one parameter included in the pattern is shown as a suspended parameter. Whereas, if it is obvious that the pattern is not specified, the fact that there is no suspended parameter is shown as no suspension.

In each box indicating a state, three numerals on the left indicate left weights Left_Weight (A) to Left_Weight (C) and three numerals on the right indicate right weights Right_Weight (A) to Right_Weight (C). For example, in the state #1, Left_Weight(A)=1, Left_Weight(B)=0, Left_Weight(C)=0, Right_Weight(A)=0, Right_Weight(B)=0, and Right_Weight(C)=1.

When the user inputs an evaluation indicating that the image quality based on the reference parameters suits the user preference, the state changes to another one as indicated by arrow "LEFT" in FIG. 6. Whereas, when the user inputs an evaluation indicating that the image quality based on the proposed parameters suits the user preference, the state changes to another one as indicated by arrow "RIGHT" in FIG. 6. For example, when the state #1 is set and the user selects the image quality based on the reference parameters as a preference, the state #1 changes to the state #2. When the user selects the image quality based on the proposed parameters as a preference, the state #1 changes to the state #11.

A concrete example of the operation in accordance with the present embodiment of the present invention will now be described.

Figure 7:
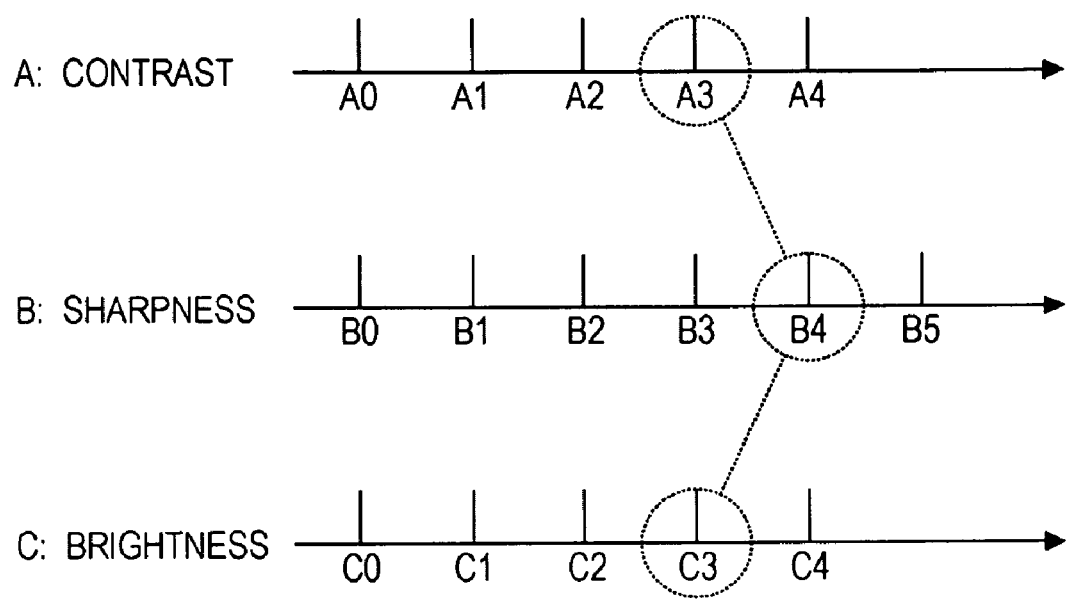
FIG. 7 is a diagram illustrating an example of parameter ranges in accordance with the embodiment of the present invention.

FIG. 7 illustrates an example of parameter ranges in the present embodiment of the present invention. In the following description, it is assumed that parameters for image display include three parameters, i.e., contrast (parameter A), sharpness (parameter B), and brightness (parameter C). Contrast is a parameter that determines the range of a pixel value of each black pixel and that of each white pixel of an image. Sharpness is a parameter that determines the level of edge enhancement. Brightness is a parameter that determines the level of image brightness.

In this example, contrast levels are set to five levels A0 to A5, sharpness levels are set to six levels B0 to B5, and brightness levels are set to five levels C0 to C4. Therefore, the number of combinations of the levels is 5×6×5=150. It is not practical that the user is allowed to evaluate all of the level combinations. In the present embodiment of the present invention, parameter settings that suit the user preference can be found using linear update and nonlinear update in combination without trying all of level combinations of parameters.

In the following description, assuming that the combination of the contrast level A3, the sharpness level B4, and the brightness level C3 best suits the user preference, the user is allowed to input an evaluation. In addition, it is assumed that the user places more importance on brightness than sharpness and further places more importance on contrast than brightness. An evaluation input is received on the condition that the above-described user preference and importance are previously unknown.

Figure 8:
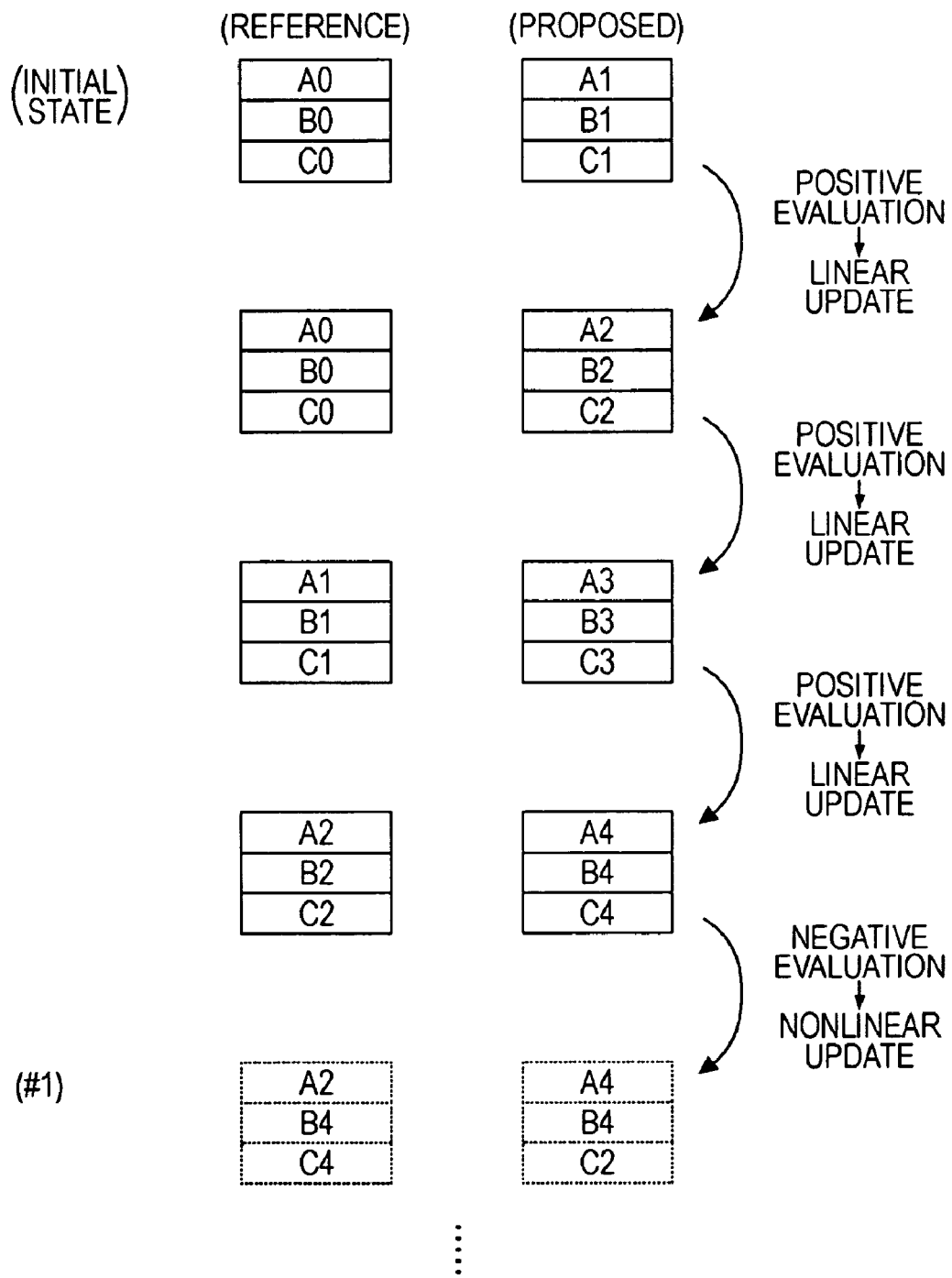
FIG. 8 is a diagram showing a first stage in a parameter transition example in accordance with the embodiment of the present invention.

FIG. 8 illustrates a first stage in a parameter transition example in the present embodiment of the present invention. It is assumed that the reference parameters V_left(A) to V_left(C) are set to a combination of the levels "A0/B0/C0" (hereinafter, simply referred to as a combination of, for example, "A0/B0/C0") and the proposed parameters V_right (A) to V_right(C) are set to a combination of "A1/B1/C1" in an initial state. As a result, a positive evaluation is input and linear update is continued.

According to linear update, the preference parameters V_best(A) to V_best(C) are updated. In this case, it is assumed that the combination of "A0/B0/C0" is set as the preference parameters. Therefore, the reference parameters are again set to the combination of "A0/B0/C0". The proposed parameters are increased by one level (INC(A), INC(B), and INC(C)) and are set to a combination of "A2/B2/C2". As a result, a positive evaluation is input and linear update is continued.

Subsequently, the preference parameters are set to the combination of "A1/B1/C1". Therefore, the reference parameters are also set to the combination of "A1/B1/C1". The proposed parameters are increased by one level, namely, set to a combination of "A3/B3/C3". As a result, a positive evaluation is input and linear update is continued.

The preference parameters are set to the combination of "A1/B1/C1". Accordingly, the reference parameters are set to the combination of "A2/B2/C2". The proposed parameters are increased by one level, namely, set to a combination of "A4/B4/C4". Consequently, the parameter A exceeds the level A3 and the parameter C exceeds the level C3, so that a negative evaluation is input. Thus, nonlinear update is performed.

Figure 9:
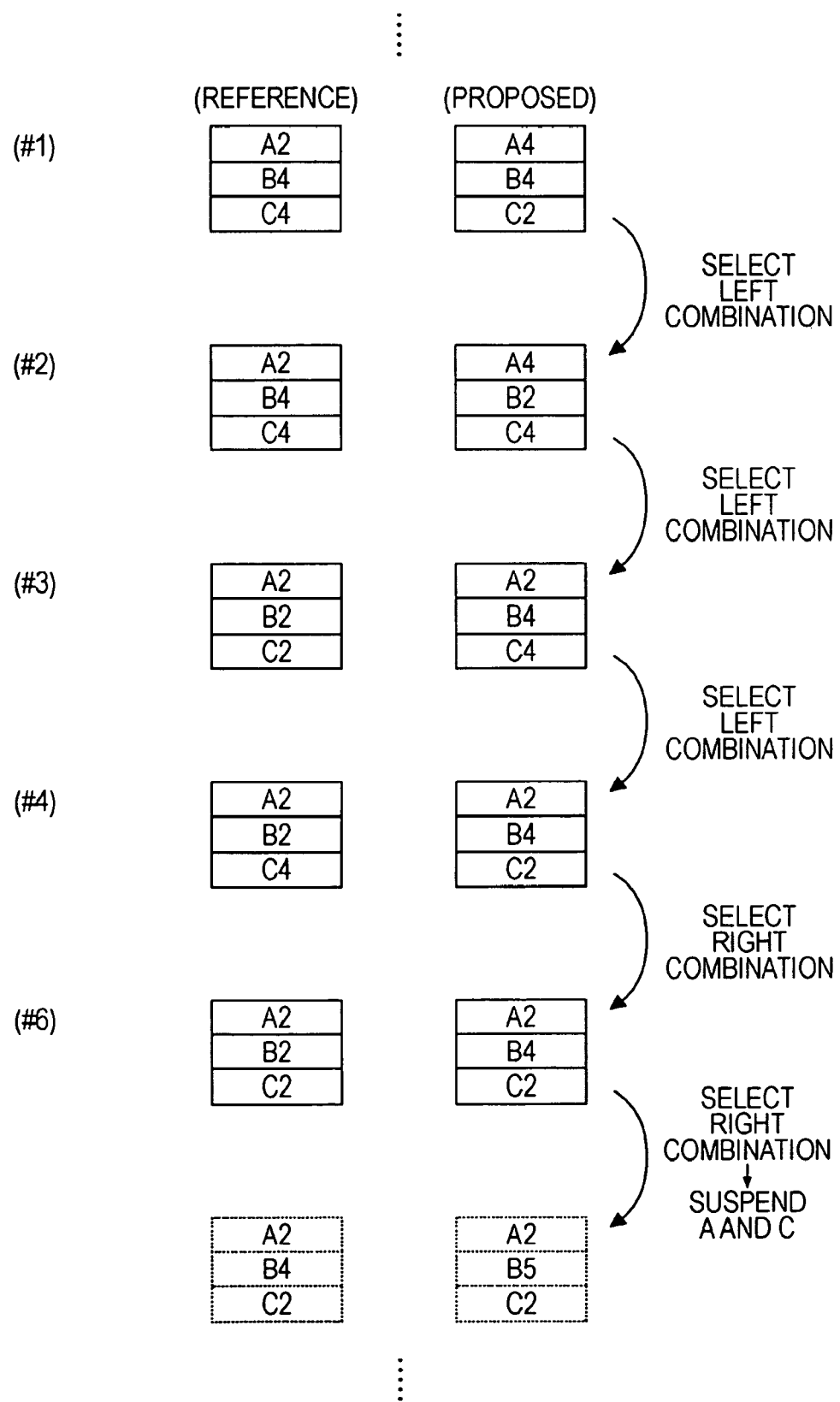
FIG. 9 is a diagram showing a second stage in the parameter transition example in accordance with the embodiment of the present invention.

FIG. 9 illustrates a second stage in the parameter transition example in the present embodiment of the present invention. An initial state of nonlinear update is the state #1 explained above with reference to FIG. 6. Specifically, the left weights Left_Weight(A) to Left_Weight(C) are set to "1/0/0" and the right weights Right_Weight(A) to Right_Weight(C) are set to "0/0/1". In this stage of nonlinear update, the preference parameters V_best(A) to V_best(C) are the combination of "A2/B2/C2" and the negatively evaluated parameters V_no (A) to V_no(C) are the combination of "A4/B4/C4". Accordingly, the reference parameters are set to a combination of "A2/B4/C4" and the proposed parameters are set to a combination of "A4/B4/C2" using Expression 4 and Expression 5. As a result, the reference parameters are selected. The state #1 changes to the state #2 in FIG. 6.

In the state #2, the left weights are set to "1/0/0" and the right weights are set to "0/1/0". Accordingly, the reference parameters are set to the combination of "A2/B4/C4" and the proposed parameters are set to a combination of "A4/B2/C4". As a result, the reference parameters are selected. The state #2 changes to the state #3 in FIG. 6.

In the state #3, the left weights are set to "1/1/1" and the right weights are set to "1/0/0". Accordingly, the reference parameters are set to the combination of "A2/B2/C2" and the proposed parameters are set to the combination of "A2/B4/C4". As a result, the reference parameters are selected. The state #3 changes to the state #4 in FIG. 6.

In the state #4, the left weights are set to "1/1/0" and the right weights are set to "1/0/1". Accordingly, the reference parameters are set to a combination of "A2/B2/C4" and the proposed parameters are set to the combination of "A2/B4/C2". As a result, the proposed parameters are selected. The state #4 changes to the state #6 in FIG. 6.

In the state #6, the left weights are set to "1/1/1" and the right weights are set to "1/0/1". Accordingly, the reference parameters are set to the combination of "A2/B2/C2" and the proposed parameters are set to the combination of "A2/B4/C2". As a result, the proposed parameters are selected. With reference to FIG. 6, it is found that the pattern that may affect the negative evaluation in the linear update includes the parameters A and C. Therefore, updating the reference and proposed parameters A and C is suspended and updating the reference and proposed parameters B is continued.

Figure 10:
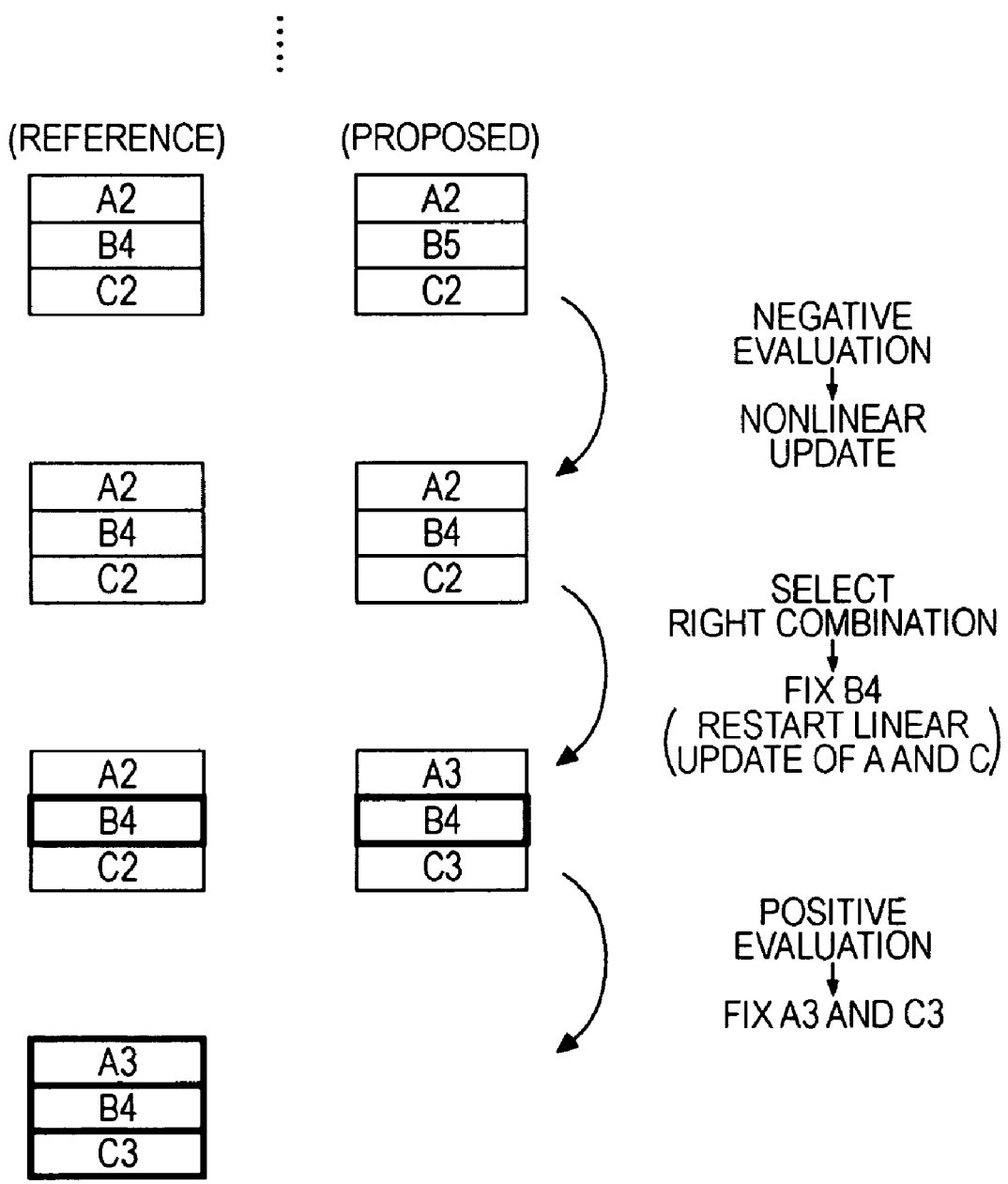
FIG. 10 is a diagram showing a third stage in the parameter transition example in accordance with the embodiment of the present invention.

FIG. 10 illustrates a third stage in the parameter transition example in accordance with the present embodiment of the present invention. Since updating the reference and proposed parameters A and C is suspended, the reference and proposed parameters B are subjected to linear update. Accordingly, the reference parameters are set to the combination of "A2/B4/C2" and the proposed parameters are set to a combination of "A2/B5/C2". As a result, since the proposed parameter B exceeds the level B4, a negative evaluation is input. Therefore, the parameter B is returned to the level B4 according to nonlinear update. The parameter B is fixed to the level B4 that suits the user preference.

Consequently, update of the reference and proposed parameters A and C is restarted and the reference parameters are set to the combination of "A2/B4/C2" and the proposed parameters are set to a combination of "A3/B4/C3". As a result, a positive evaluation is input. According to the update history, the combination of the parameters "A4/B4/C4" has already been negatively evaluated. Thus, the parameters "A3/B4/C3" are determined as a parameter combination that suits the user preference.

As described above, according to the present embodiment of the present invention, the parameter updating unit 280 updates the reference parameters and the proposed parameters linearly or nonlinearly on the basis of an evaluation input on the image qualities of the reference and proposed parameters, so that a parameter combination that suits the user preference can be determined.

In the present embodiment of the present invention, an image based on the reference parameters is displayed on the left of the screen and an image based on the proposed parameters is displayed on the right thereof. Those positions may be appropriately changed. For example, when one combination of parameters updated is the same as another combination of parameters before update, the display positions of those combinations are interchanged so that one image is not changed before and after update. Consequently, a confusion caused by simultaneously changing the left and right images can be avoided and the user can be prevented from being confused with the simultaneous change.

The embodiment of the present invention embodies an example of the present invention and the specific elements disclosed in the embodiment of the present invention correspond to the features of the claims as follows. It should be understood by those skilled in the art that various modifications, combinations, sub-combinations and alterations may occur depending on design requirements and other factors insofar as they are within the scope of the appended claims or the equivalents thereof.

The image-quality presenting unit 290 corresponds to, for example, a converting section according to an embodiment of the present invention. The evaluation-input receiving unit 210 corresponds to, for example, an evaluation-input receiving section according to the embodiment of the present invention. The parameter updating unit 280 corresponds to, for example, a parameter updating section according to the embodiment of the present invention.

The evaluation-time measuring unit 220 corresponds to, for example, a time measuring section according to the embodiment of the present invention.

Step S913 or S923 corresponds to, for example, a step of receiving an evaluation input according to an embodiment of the present invention. Steps S916 to S918, or step S921 corresponds to, for example, a step of updating parameters according to the embodiment of the present invention.

The process described in the foregoing embodiment of the present invention may be treated as a method including a series of processing steps, or may be treated as a program that allows a computer to execute the series of processing steps or a recording medium that stores the program.

What is claimed is:

1. A signal converting apparatus comprising:
converting means for converting an input signal into output signals on the basis of the values of reference parameters, serving as references of a plurality of parameters for signal conversion, and the values of newly proposed parameters;
evaluation input receiving means for receiving an evaluation input indicating the selection of either the output signal based on the values of the reference parameters or the output signal based on the values of the newly proposed parameters; and
parameter updating means for linearly changing the values of the newly proposed parameters when the evaluation input indicates the selection of the output signal based on the values of the newly proposed parameters, and nonlinearly changing the values of the reference parameters and the values of the newly proposed parameters when the evaluation input indicates the selection of the output signal based on the values of the reference parameters.

2. The apparatus according to claim 1, further comprising:
time measuring means for measuring the time taken before the evaluation input is received, wherein
when the evaluation input indicates the selection of the output signal based on the values of the newly proposed parameters, the parameter updating means linearly changes the values of the reference parameters in accordance with the time measured by the time measuring means.

3. The apparatus according to claim 2, wherein the parameter updating means changes the values of the reference parameters such that the values of the reference parameters are larger as the time measured by the time measuring means is shorter.

4. The apparatus according to claim 1, wherein the parameter updating means nonlinearly changes the values of the newly proposed parameters and then linearly changes the values of the reference and newly proposed parameters corresponding to any one of the plurality of parameters.

5. The apparatus according to claim 1, wherein the plurality of parameters for signal conversion include at least one of contrast, sharpness, and brightness of an image signal.

6. A method of signal conversion for a signal converting apparatus that converts an input signal into output signals on the basis of the values of reference parameters, serving as references of a plurality of parameters for signal conversion, and the values of newly proposed parameters, the method comprising the steps of:

receiving an evaluation input indicating the selection of either the output signal based on the values of the reference parameters or the output signal based on the values of the newly proposed parameters; and
linearly changing the values of the newly proposed parameters when the evaluation input indicates the selection of the output signal based on the values of the newly proposed parameters, and nonlinearly changing the values of the reference parameters and the values of the newly proposed parameters when the evaluation input indicates the selection of the output signal based on the values of the reference parameters.

7. A non-transitory computer-readable medium storing instructions which, when executed by a computer, cause the computer to execute a process for a signal converting apparatus that converts an input signal into output signals on the basis of the values of reference parameters, serving as references of a plurality of parameters for signal conversion, and the values of newly proposed parameters, the process comprising the steps of:
receiving an evaluation input indicating the selection of either the output signal based on the values of the reference parameters or the output signal based on the values of the newly proposed parameters; and
linearly changing the values of the newly proposed parameters when the evaluation input indicates the selection of the output signal based on the values of the newly proposed parameters, and nonlinearly changing the values of the reference parameters and the values of the newly proposed parameters when the evaluation input indicates the selection of the output signal based on the values of the reference parameters.

8. A signal converting apparatus comprising:
a converting section that converts an input signal into output signals on the basis of the values of reference parameters, serving as references of a plurality of parameters for signal conversion, and the values of newly proposed parameters;
an evaluation input receiving section that receives an evaluation input indicating the selection of either the output signal based on the values of the reference parameters or the output signal based on the values of the newly proposed parameters; and
a parameter updating section that linearly changes the values of the newly proposed parameters when the evaluation input indicates the selection of the output signal based on the values of the newly proposed parameters, and nonlinearly changes the values of the reference parameters and the values of the newly proposed parameters when the evaluation input indicates the selection of the output signal based on the values of the reference parameters.

* * * * *